March 5, 1935. J. GATTONI 1,993,698
PRECISION BALANCE
Filed Feb. 8, 1933
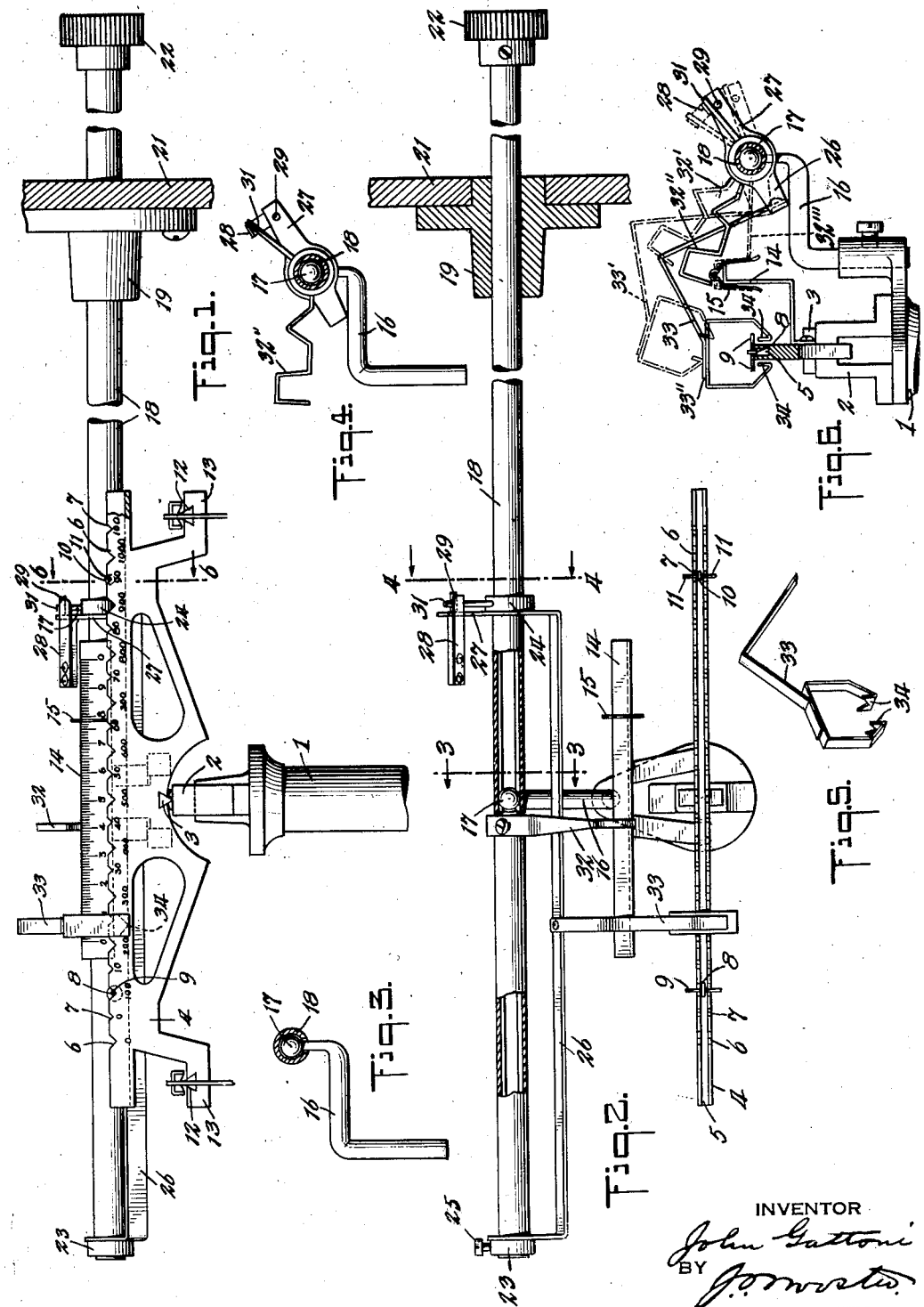
INVENTOR
John Gattoni
BY
ATTORNEY Patented Mar. 5, 1935

1,993,698

UNITED STATES PATENT OFFICE 1,993,698

PRECISION BALANCE

John Gattoni, Union City, N. J., assignor to Seederer-Kohlbusch, Inc., Jersey City, N. J., a corporation of New Jersey Application February 8, 1933, Serial No. 655,694

13 Claims. (Cl. 265—54)

This invention relates to a precision balance.

An object of the invention is to provide a balance in which weighing can be easily, quickly and accurately accomplished.

Another object of the invention is to provide means for shifting poises on a notched beam or a rider on a graduated scale without interference.

These and other objects are accomplished by means of a frame mounted on a rotatable and horizontally movable shaft which carries a spring, and a pin, also mounted on the frame, adapted to be moved against the action of the spring. An arm mounted on the shaft is adapted to move a rider along a graduated scale, and an arm mounted on the frame is adapted to move a poise along a notched beam, but such movements are normally prevented by the action of the spring. Upon slight rotation of the shaft, the pin is moved against the action of the spring, and the poise may be moved along the notched beam without moving the rider. Upon further rotation of the shaft, the rider may be moved along the scale, without moving the poise. By such arrangement it is possible to quickly obtain delicate and accurate readings without interference between any movable parts.

In the drawing:

Fig. 1 is an elevational view of the balance;

Fig. 2 is a top plan view of the balance;

Fig. 3 is a vertical sectional view of the shaft, ball and curved arm on the line 3—3 of Fig. 2;

Fig. 4 is a vertical sectional view of the spring and frame on the line 4—4 of Fig. 2;

Fig. 5 is a perspective view of the arm having a plurality of V-shaped grips; and Fig. 6 is a vertical sectional view of the balance on the line 6—6 of Fig. 1.

Referring now to the drawing, 1 is a standard having a knife edge bearing 2 carrying the knife edge 3 of beam 4. The beam 4 has a longitudinal slot 5 and notches 6 graduated from 0 to 1000, and relatively smaller notches 7 graduated from 0 to 100. A movable poise 8 having spindles 9 is adapted to fit in notches 6, and a relatively smaller movable poise 10 having spindles 11 is adapted to fit in notches 7. Knife edges 12 are mounted on arms 13 at the ends of beam 4 and carry scale pans (not shown). A scale 14, graduated from 0 to 10, is secured to the back face of beam 4 or may be integral therewith, and carries a movable rider 15.

A curved arm 16 is secured to the standard in the well-known manner, and has a ball 17 at its free end. A rotatable and horizontally movable hollow shaft 18 substantially encloses the ball 17 and is supported and guided thereby in its longitudinal movement. The shaft 18 passes through a bearing 19 mounted on casing 21, and has a knurled knob 22 exterior of the casing for controlling the movement of the shaft.

The shaft 18 carries two bearings 23 and 24 which are adjustable lengthwise of the shaft. Bearing 23 is secured in position on the shaft by means of screw 25. Mounted loosely on the shaft 18, and between bearings 23 and 24, is a frame 26 extending in front of the shaft and having an arm 27 extending in back of the shaft. The arm 27 carries a spring 28 and a stop pin 29. A pin 31 is screw-threaded in bearing 24, holding the same in position on shaft 18, and is adapted to be moved against the action of spring 28. An arm 32 carried by shaft 18, is adapted to move rider 15, and an arm 33 having a plurality of V-shaped grips 34, carried by frame 26, is adapted to move the movable poises 8 and 11.

The spring 28 normally holds pin 31 against stop pin 29 and the arms 32 and 33 are normally above and out of operative movable relation with the rider and poises, as shown by dotted lines 32' and 33' in Fig. 6. To move either poise 8 or 10, shaft 18 is slightly rotated in a counter-clockwise direction, the degree of rotation being limited by frame 26 meeting curved arm 16, arm 33 being brought into operative movable relation with poise 8 or poise 10, as shown in solid lines 33", while arm 32 is not in operative movable relation with rider 15, as shown by 32". The shaft 18 is moved lengthwise until the V-shaped grips 34 are directly beneath the spindles 9 of poise 8 or the spindles 11 of poise 10. Upon rotation of the shaft 18 in a clockwise direction, poise 8 or poise 10 may be picked up and moved from its position to any other desired position.

To move rider 15 along scale 14, shaft 18 is rotated in a counter-clockwise direction until arm 32 is brought into operative movable relation with rider 15, as shown by dotted lines 32'''. In such case the frame 26 is still limited in its travel by the curved arm 16, and arm 33 assumes its position with V-shaped grips 34 beneath poise 8. However, the shaft 18 is capable of rotation until arm 32 is in operable position, so that rider 15 may be moved, without movement or displacement of poises 8 or 10.

It is obvious that beam 4 may have only one set of graduations and one poise, instead of two as illustrated, and that scale 14 and curved arm 16 may be mounted in other ways. Many other modifications may be made without departing from the spirit and scope of the invention, and I am not to be limited to any specific embodiment or form, except as indicated in the appended claims.

The invention claimed is:

1. In a balance, a beam having a plurality of tracks, weights movable on said tracks, a rotatable and longitudinally movable shaft adjacent said tracks, an arm carried by said shaft in position to reach under one of said weights and to lift it when said arm is raised by rotation of said shaft, and a second arm carried by said shaft in position to reach over another track and to contact with the weight thereon whereby said weights may be moved independently by movement of said shaft.

2. In a balance, a beam having a plurality of tracks, weights movable on said tracks, a rotatable and longitudinally movable shaft adjacent said tracks, an arm carried by said shaft in position to reach under one of said weights and to lift it when said arm is raised by rotation of said shaft, a second arm carried by said shaft in position to reach over another track and to contact with the weight thereon whereby said weights may be moved independently by movement of said shaft, and means acting on said shaft to hold said arms out of operative relation with said weights.

3. In a balance, a beam having a plurality of notches, a movable poise cooperating with said notches, a scale carried by said beam, a rider movable on said scale, a rotatable and longitudinally movable shaft adjacent said beam and said scale, an arm carried by said shaft having grips arranged to reach beneath said poise and to lift it when said arm is raised by rotation of said shaft, and a second arm carried by said shaft in position to reach over said scale and contact with said rider when the grips of said first-mentioned arm are beneath said poise whereby said poise and said rider may be moved independently by movement of said shaft.

4. In a balance, a beam having a plurality of notches, a movable poise cooperating with said notches, a scale carried by said beam, a rider movable on said scale, a rotatable and longitudinally movable shaft adjacent said beam and said scale, an arm carried by said shaft having grips arranged to reach beneath said poise and to lift it when said arm is raised by rotation of said shaft, a second arm carried by said shaft in position to reach over said scale and contact with said rider when the grips of said first-mentioned arm are beneath said poise whereby said poise and said rider may be moved independently by movement of said shaft, and a spring acting on said shaft in a direction to rotate said arms out of operative relation with said poise and said rider.

5. In a balance, a graduated beam, a scale carried by said beam, weights movable on said beam and scale, a rotatable and longitudinally movable shaft adjacent said beam and scale, means carried by said shaft for selectively engaging and moving said weights according to the position of said shaft, and means acting on said shaft in a direction to rotate said engaging and moving means out of operative relation with said weights.

6. In a balance, a horizontally slotted beam having notches, graduations correlated with said notches, a poise co-operating with said notches, a graduated scale, a rider movable on said scale, a rotatable and horizontally movable shaft, means for supporting and guiding said shaft, a frame mounted on said shaft, a spring carried by said frame, a pin adapted to be moved against the action of said spring, an arm having a plurality of V-shaped grips adapted to move said poise, and an arm carried by said shaft adapted to move said rider.

7. In a balance, a horizontally slotted beam having a plurality of notches, graduations correlated with said notches, a plurality of poises co-operating with said notches, a graduated scale, a rider movable on said scale, a rotatable and horizontally movable shaft, means for supporting and guiding said shaft, a frame mounted on said shaft, a spring carried by said frame, means adapted to be moved against the action of said spring, an arm having a plurality of V-shaped grips adapted to move said poises carried by said frame, and an arm carried by said shaft adapted to move said rider.

8. In a balance, a beam having a plurality of notches, a movable poise cooperating with said notches, a scale carried by said beam, a rider movable on said scale, a rotatable and longitudinally movable shaft adjacent said beam and said scale, a frame loosely mounted on said shaft, arms carried by said frame and said shaft for selectively engaging and moving said poise and said rider, and a spring acting on said frame and said shaft in a direction to hold said arms out of operative relation with said poise and rider.

9. In a balance, a standard, a horizontally slotted beam pivoted on said standard and having notches, graduations correlated with said notches, a plurality of movable poises cooperating with said notches, a graduated scale in back of and above said beam, a rider movable on said scale, a rotatable and horizontally movable shaft, means secured to said standard for supporting and guiding said shaft, a frame mounted on said shaft, a spring carried by said frame, a pin adapted to be moved against the action of said spring, an arm having a plurality of V-shaped grips adapted to move said poises carried by said frame, and an arm carried by said shaft adapted to move said rider.

10. In a balance, a standard, a horizontally slotted beam pivoted on said standard and having notches, graduations correlated with said notches, a movable poise cooperating with said notches, a graduated scale in back of and above said beam, a rider movable on said scale, a curved arm secured to said standard and having a ball at its free end, a rotatable and horizontally movable hollow shaft substantially enclosing said ball and adapted to be guided thereby, a frame mounted on said shaft and having an arm extending in back of said shaft, a spring carried by said arm, means adapted to be moved against the action of said spring, means for moving said poise, and means for moving said rider.

11. In a balance, a standard, a horizontally slotted beam pivoted on said standard and having a plurality of notches of different size, graduations correlated with said notches, a plurality of movable poises cooperating with said notches, a graduated scale in back of and above said beam, a rider movable on said scale, a curved arm secured to said standard and having a ball at its free end, a rotatable and horizontally movable hollow shaft substantially enclosing said ball and adapted to be guided thereby, a frame mounted on said shaft and having an arm extending in back of said shaft, a spring carried by said arm, means adapted to be moved against the action of said spring, means for moving said poises, and means for moving said rider.

12. In a balance, a casing, a standard therein, a horizontally slotted beam pivoted on said standard and having a plurality of notches of different size, graduations correlated with said notches, a plurality of movable poises cooperating with said notches, a graduated scale attached to the rear face of and above said beam, a rider movable on said scale, a curved arm secured to said standard and having a ball at its free end, a rotatable and horizontally movable hollow shaft substantially enclosing said ball and adapted to be guided thereby, bearings mounted on said shaft and adjustable lengthwise thereof, a frame loosely mounted on said shaft between said bearings and having an arm extending in back of said shaft, a spring carried by said arm, a pin adapted to be moved against the action of said spring, means comprising a plurality of V-shaped grips for moving said poises, means for moving said rider, and means outside said casing for controlling the movement of said shaft and said other means.

13. In a balance, a casing, a standard therein, a horizontally slotted beam pivoted on said standard and having a plurality of notches of different size, graduations correlated with said notches, a plurality of movable poises cooperating with said notches, a graduated scale attached to the rear face of and above said beam, a rider movable on said scale, a curved arm secured to said standard and having a ball at its free end, a rotatable and horizontally movable hollow shaft substantially enclosing said ball and adapted to be guided thereby, bearings mounted on said shaft and adjustable lengthwise thereof, a frame loosely mounted on said shaft between said bearings and extending in front of said shaft, said frame having an arm extending in back of said shaft, a spring carried by said frame arm, a pin carried by one of said bearings and adapted to be moved against the action of said spring, an arm having a plurality of V-shaped grips adapted to move said poises carried by said frame, an arm carried by said shaft adapted to move said rider, and means outside said casing for controlling the movement of said shaft and said arms.

JOHN GATTONI.